(12) United States Patent
Sato

(10) Patent No.: US 8,285,238 B2
(45) Date of Patent: Oct. 9, 2012

(54) RECEIVER

(75) Inventor: Masaru Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1185 days.

(21) Appl. No.: 12/003,743

(22) Filed: Dec. 31, 2007

(65) Prior Publication Data

US 2008/0200141 A1   Aug. 21, 2008

(30) Foreign Application Priority Data

Feb. 20, 2007   (JP) ................. 2007-039618

(51) Int. Cl.
*H04B 1/18* (2006.01)
*H04B 1/04* (2006.01)

(52) U.S. Cl. ......... 455/281; 455/129; 455/254; 455/338

(58) Field of Classification Search .......... 455/254, 455/269, 280, 281, 289, 333, 334, 338
See application file for complete search history.

(56) References Cited

U.S. PATENT DOCUMENTS

| | | | |
|---|---|---|---|
| 4,837,530 A | 6/1989 | Kondoh | |
| 6,870,497 B2 * | 3/2005 | Kondo et al. | 342/1 |
| 7,242,911 B2 * | 7/2007 | Yu | 455/78 |
| 7,468,708 B2 * | 12/2008 | Park et al. | 343/841 |

FOREIGN PATENT DOCUMENTS

| | | |
|---|---|---|
| JP | 56-108945 A | 8/1981 |
| JP | 2-2702 A | 1/1990 |
| JP | 07-250003 A | 9/1995 |
| JP | 2006-080647 A | 3/2008 |

OTHER PUBLICATIONS

M.E. Tiuri; "Radio Astronomy Receivers"; IEEE Trans. On Antenna and Propagation; vol. AP; pp. 930-938; Dec. 1964.
M.K. Joung, Thesis for Doctoral degree; University of Tohoku; 2004.
Yui-Jiu Wang et al.; "A V-Band MMIC SPDT Passive HEMT Switch Using Impedance Transformation Networks"; 2001 IEEE MTT-S int. Microwave Symp.; 2001.
Tanaka et al.; "A 76-77 GHz High Isolation GaAs PIN-Diode Switch MMIC" R & D Review of Toyota CRDL; vol. 37; No. 2.

* cited by examiner

*Primary Examiner* — Quochien B Vuong
(74) *Attorney, Agent, or Firm* — Arent Fox LLP

(57) ABSTRACT

A compact receiver which is easy in adjustment of a reference signal level is provided. A receiver having an antenna for receiving a wireless signal, a single pole single through switch which passes a signal received via the aforesaid antenna and outputs the signal when a first control signal is in a first state, and connects a signal received via the aforesaid antenna to a reference potential when the first control signal is in a second state, and a difference circuit which outputs a difference signal of an output signal of the aforesaid single pole single through switch when the first control signal is in the first state and an output signal of the aforesaid single pole single through switch when the first control signal is in the second state is provided.

20 Claims, 3 Drawing Sheets

RECEIVER

CROSS-REFERENCE TO RELATED APPLICATIONS

This application is based upon and claims the benefit of priority from the prior Japanese Patent Application No. 2007-039618, filed on Feb. 20, 2007, the entire contents of which are incorporated herein by reference.

BACKGROUND OF THE INVENTION

1. Field of the Invention

The present invention relates to a receiver.

2. Description of the Related Art

A "millimeter wave passive image sensor" which detects minute millimeter wave signals irradiated from substances needs a receiver with high sensitivity.

FIG. 6 is a diagram showing a configuration example of a total-power receiver as an example of a receiver (see the following Non-Patent Document 1). A total-power receiver is frequently used since its circuit configuration is simple. The circuit configuration will be briefly described. A low noise amplifier (LNA) 104 amplifies a signal received from an antenna 102. A wave detector 105 detects the amplified signal. An integrator 111 integrates the detected signal and outputs the signal to a signal processing circuit 112. The problem of the total-power receiver is that when a signal level is small, especially when it is close to a noise level which the low noise amplifier 104 generates, the total-power receiver cannot detect a signal. When signal power is small, the sensitivity of the total-power receiver cannot be made high.

FIG. 7 is a configuration example of a Dicke type receiver which is designed for the purpose of making a total-power receiver highly sensitive (see Non-Patent Document 1). An SPDT (Single Pole Double Through) switch 702 is disposed at a pre-stage of the low noise amplifier 104, and an SPDT switch 106 is disposed at a post-stage of the detector 105. A switch driver 703 simultaneously controls the switches 106 and 702. When the switch 702 is connected to the antenna 102, the switch 106 is connected to an arithmetic unit 108. When the switch 702 is connected to a reference signal source 701, the switch 106 is connected to an arithmetic unit 109. The arithmetic unit 108 multiplies a signal received by the antenna 102 by +1. The reference signal source 701 outputs a reference signal. The arithmetic unit 109 multiplies a reference signal by −1. By controlling the switches 702 and 106, the signal received by the antenna 102 is amplified and detected for a half of a period, and the reference signal (usually, heat noise generated by resistance) is amplified and detected for the remaining half of the period. An adder 110 adds output signals of the arithmetic units 108 and 109. The integrator 111 integrates an output signal of the adder 110, and outputs the signal to the signal processing circuit 112. By subtracting the signal of the antenna 102 and the reference signal which are amplified, a noise component generated by the low noise amplifier 104 can be cancelled.

FIG. 8 is a diagram showing another configuration example of a Dicke type receiver (see the following Non-Patent Document 2). In this receiver, instead of the SPDT switch 702 of FIG. 7, a chopper 801 is disposed at the pre-stage of the antenna 102. A radio wave absorber 802 is bonded to the chopper 801. An area 803 does not absorb a radio wave. A switch driver 804 controls the rotation of the chopper 801 and switching of the switch 106. By rotating the chopper 801, it is operated as a switch.

Further, the following Non-Patent Document 3 discloses one example of the SPDT switch using a transistor. Further, the following Patent Document 4 discloses one example of the switch using a diode.

[Non-Patent Document 1] M. E. Tiuri, "Radio Astronomy Receivers", IEEE Trans. On Antenna and Propagation, vol. AP, pp. 930-938, December 1964.

[Non-Patent Document 2] M. K. Joung, Thesis for doctoral degree, University of Tohoku, 2004

[Non-Patent Document 3] Yu-Jiu Wang et al., "A V-Band MMIC SPDT Passive HEMT Switch Using Impedance Transformation Networks", 2001 IEEE MTT-S Int. Microwave Symp., 2001

[Non-Patent Document 4] Tanaka et al. "A 76-77 GHz High Isolation GaAs PIN-Diode Switch MMIC" R&D Review of Toyota CRDL Vol. 37 No. 2

The first problem of the above described receivers in FIGS. 7 and 8 is that they require relatively large areas. Therefore, when a number of receivers are used, reduction in size is difficult. In the case of FIG. 8, the size of the chopper 801 requires the area several times as large as the antenna 102.

FIG. 9 is a diagram showing one example of the SPDT switches 702 and 106 used in FIG. 7. The SPDT switch requires three matching circuits 901 to 903 and a distributor 906 in addition to SPST (Single Pole Single Through) switches 904 and 905. The matching circuits 901 to 903 are circuits which reduces reflection of power. The matching circuits 901 to 903 usually use transmission lines and require relatively large circuit spaces. Since the three matching circuits 901 to 903 are included, it is difficult to reduce the size of the receiver.

The second problem of the above described receivers in FIGS. 7 and 8 is that adjustment of the reference signal level is difficult. In order to change the reference signal level in the case of FIG. 8, no method is available except for the method in which the kind of the radio wave absorber 802 is changed. In the case of FIG. 7, the method in which the level of thermal noise is changed by increasing the temperature of the resistor or cooling the resistor can be considered. In the case of increasing the temperature of the resistor, influence of the temperature change simultaneously occurs to the low noise amplifier 104 or the like, and proper adjustment cannot be performed.

SUMMARY OF THE INVENTION

According to one aspect, a receiver having an antenna for receiving a wireless signal, a single pole single through switch which passes a signal received via the aforesaid antenna and outputs the signal when a first control signal is in a first state and connects a signal received via the aforesaid antenna to a reference potential when the first control signal is in a second state, and a difference circuit which outputs a difference signal of an output signal of the aforesaid single pole single through switch when the first control signal is in the first state and an output signal of the aforesaid single pole single through switch when the first control signal is in the second state is provided.

DETAILED DESCRIPTION OF THE PREFERRED EMBODIMENTS

Figure 1:
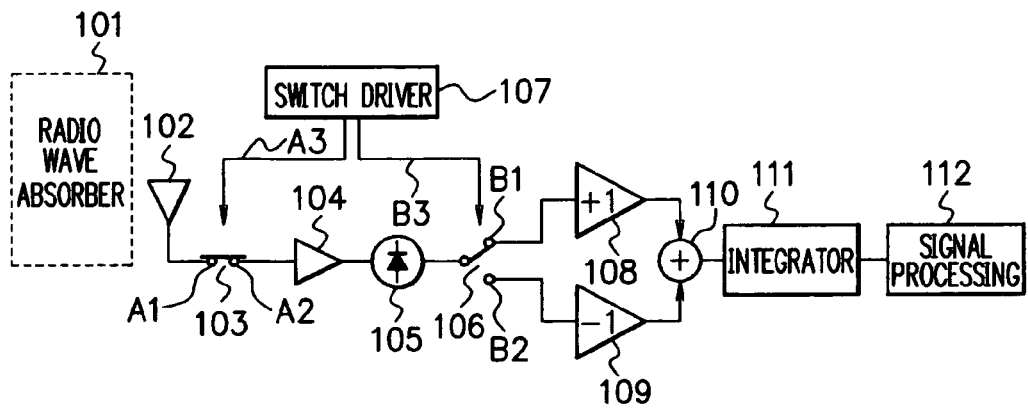
FIG. 1 is a diagram showing a configuration example of a Dicke type receiver according to an embodiment of the present invention.

FIG. 1 is a diagram showing a configuration example of Dicke type receiver according to an embodiment of the present invention. The receiver can be used as a high sensitive receiver used in a millimeter wave passive image sensor, a radio telescope or the like. The millimeter wave passive image sensor detects minute millimeter wave signals irradiated from substances.

A radio wave absorber 101 is a radio wave absorber for shutting off input of radio waves to an antenna 102, is provided only at the time of adjusting the reference signal level for noise canceling, and is removed when the antenna 102 receives radio waves after adjustment. The radio wave absorber 101 is made by putting carbon or ferrite in rubber, for example.

The antenna 102 is an antenna for receiving a wireless signal of, for example, 100 GHz. A switch driver 107 controls an SPST (Single Pole Single Through) switch 103 by a bias A3, and controls an SPDT (Single Pole Double Through) switch 106 by a first control signal B3. In the SPST switch 103, a terminal A1 is connected to the antenna 102, and a terminal A2 is connected to the low noise amplifier 104.

The low noise amplifier 104 is provided between the SPST switch 103 and the wave detector 105, and amplifies the signal of the terminal A2 of the SPST switch 103. The wave detector 105 is provided between the low noise amplifier 104 and the SPDT switch 106, and detects a signal amplified by the low noise amplifier 104. More specifically, the wave detector 105 has a diode, and outputs a voltage inputted in the diode as a half wave rectification current. In the diode, the voltage and the current characteristic have square components, and therefore, can perform square-law detection.

The SPDT switch 106 connects an output signal of the wave detector 105 to a terminal B1 or B2 in response to the first control signal B3. An arithmetic unit 108 is a multiplier which multiplies the signal of the terminal B1 by +1. An arithmetic unit 109 is a multiplier which multiplies the signal of the terminal B2 by −1. An adder 110 adds the signals multiplied by the arithmetic units 108 and 109. An integrator 111 integrates a signal added by the adder 110 and outputs the result to a signal processing circuit 112.

Figure 2:
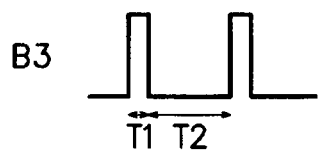
FIG. 2 is a diagram showing an example of a pulse waveform of a first control signal which is outputted by a switch driver.

FIG. 2 is a diagram showing an example of a pulse waveform of the first control signal B3 outputted by the switch driver 107. The first control signal B3 has a period of a high level term T1 and a low level term T2. A duty ratio is expressed by T1/(T1+T2). The switch driver 107 outputs the first control signal B3. The first control signal B3 is a pulse signal including a high level and a low level. The switch driver 107 can change duty ratios at a high level and a low level of the first control signal B3.

When the switch driver 107 outputs the first control signal B3 at a high level, it outputs a negative bias A3. When the first control signal B3 becomes a high level, the switch 106 connects the output terminal of the detector 105 to the input terminal of the arithmetic unit 108. When the bias A3 becomes negative, the switch 103 passes the input signal of the terminal A1 and outputs it from the terminal A2. The arithmetic unit 108 multiplies a received signal of the antenna 102 by +1.

When the switch driver 107 outputs the first control signal B3 at a low level, it outputs the positive bias A3. When the first control signal B3 is at a low level, the switch 106 connects an output terminal of the wave detector 105 to an input terminal of the arithmetic unit 109. When the bias A3 becomes positive, the switch 103 does not pass the input signal of the terminal A1, but outputs a reference signal from the terminal A2. The arithmetic unit 109 multiplies the reference signal by −1.

The integrator 111 integrates output signals of the arithmetic units 108 and 109. Specifically, the integrator 111 averages the output signal of the arithmetic unit 108 and the output signal of the arithmetic unit 109 timewise. Since the antenna 102 is shut off from radio wave input by the radio wave absorber 101, the amplified signal of the reference signal is subtracted from the amplified signal of the antenna 102, and thereby, the magnitude relation of the amplified signals of both of them can be recognized.

Figure 3:
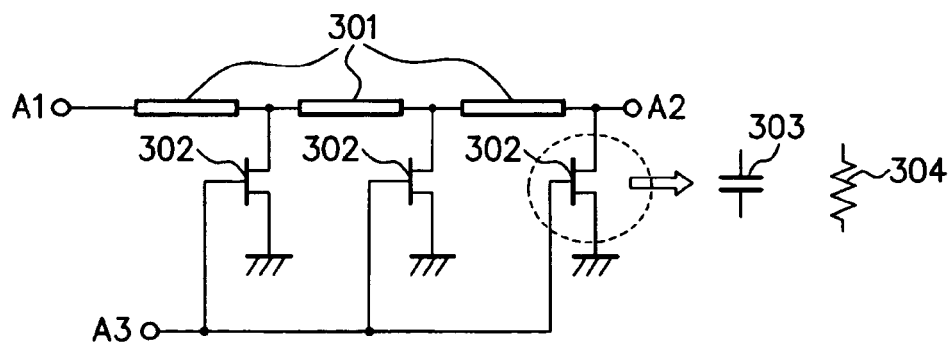
FIG. 3 is a circuit diagram showing a configuration example of an SPST switch.

FIG. 3 is a circuit diagram showing a configuration example of the SPST switch 103. A plurality of inductors 301 are connected in series between the terminals A1 and A2. The inductor 301 may be an inductor component of a transmission line. A plurality of n-channel field-effect transistors 302 are connected in parallel, drains and sources are respectively connected to interconnection points and reference potentials of a plurality of inductors 301, and gates are connected to a bias A3 corresponding to the first control signal B3.

When the bias A3 is a negative bias, the transistor 302 functions as a capacitor 303. In this case, the inductor 301 and the capacitor 303 function as a matching circuit, and when, for example, impedance matching of 50Ω is achieved, the signal inputted in the terminal A1 passes through the switch 103 and is outputted from the terminal A2. The impedance is expressed by $\sqrt{(L/C)}$.

On the other hand, when the bias A3 is a positive bias, the transistor 302 functions as a resistance 304. Since impedance matching is not achieved in this case, the signal inputted in the terminal A1 does not pass through the switch 103. The terminal A2 outputs a reference signal (noise) corresponding to the resistance 304.

When the bias A3 of a negative voltage (for example, −1V) is applied to the gate of the transistor 302, the drain and source of the transistor 302 are equivalently regarded as the capacitor 303. When the length (or the value of inductance) of the inductor (transmission line) 301 is adjusted, the inductor 301 can be regarded as an L-C transmission line, and therefore, this is brought into an on state of the switch 103.

When the bias A3 at a slightly positive voltage (for example, 0.2 V) is applied to the gate of the transistor 302 on the other hand, the drain and source of the transistor 302 can be equivalently regarded as the resistance 304. The value of the resistance 304 differs depending on devices, but it is generally about several ohms to 10 ohms. Since the transistors 302 are connected in parallel, the combined resistance can be made low, and the transmission line between the terminals A1 and A2 are equivalently short-circuited to the ground. This is the off state of the switch 103.

In this embodiment, an attention is paid to the off state of the switch 103. The off state of the switch 103 is generally considered as a short (short circuit), but there is actually the resistance component 304. If the bias A3 is set at a high positive voltage, a short occurs, but by setting the bias A3 at a low positive voltage, the resistance 304 occurs. The resistance component 304 is regarded as a reference signal source. The reference signal level (noise level) which the resistor 304 generates differs depending on devices, and differs depending on the number of transistors 302 connected in parallel. The reference signal level is adjusted by the switch driver 107 changing the duty ratio of the first control signal B3.

Figure 5:
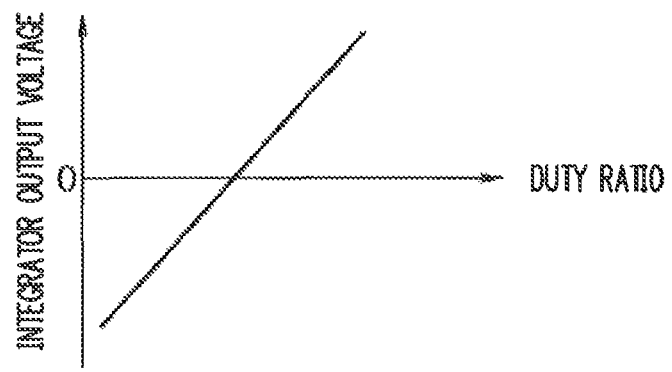
FIG. 5 is a graph showing relationship of a duty ratio of the first control signal and an output voltage of an integrator.
Figure 6:
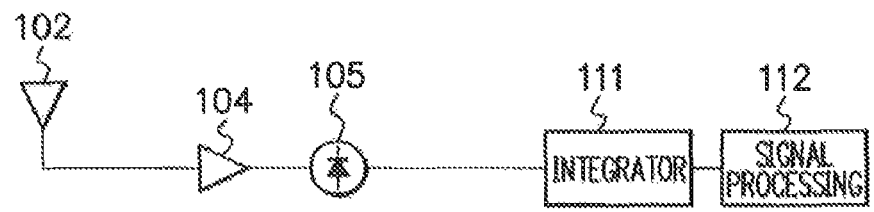
FIG. 6 is a diagram showing a configuration example of a total-power receiver.

FIG. 5 is a graph showing the relation of the duty ratio of the first control signal B3 and the output voltage of the integrator 111. The duty ratio of the first control signal B3 is expressed by T1/(T1+T2) as shown in FIG. 2. When the duty ratio is small, the output signal integrated value of the arithmetic unit 108 is smaller than the output signal integrated value of the arithmetic unit 109, and the output voltage of the integrator 111 becomes negative. When the duty ratio is large on the other hand, the output signal integrated value of the arithmetic unit 108 is larger than the output signal integrated value of the arithmetic unit 109, and the output voltage of the integrator 111 becomes positive. As the duty ratio becomes larger, the output voltage of the integrator 111 becomes higher.

First, the radio wave absorber 101 is disposed directly before the antenna 102. Next, the power supply of the receiver is turned on, and the output voltage of the integrator 111 is monitored. When the noise level outputted by the antenna 102 is equivalent to the reference signal level generated by the transistor 302 (resistance 304) when the switch 103 is off, the output voltage of the integrator 111 becomes zero. If it is not zero, the duty ratio of the first control signal B3 is adjusted by the switch driver 107, and the duty ratio with which the output voltage of the integrator 111 becomes zero is found. For example, if the output voltage of the integrator 111 is positive at a certain duty ratio, it corresponds to the fact that the reference signal level is small. Accordingly, the low level term T2 of the first control signal B3 is increased, and the output time of the reference signal is increased. Then, the output voltage of the integrator 111 becomes close to zero. When the output voltage of the integrator 111 becomes zero, the duty ratio is fixed, and reference signal level adjustment for noise canceling is finished.

Thereafter, the radio wave absorber 101 is removed, and normal receiving processing is performed. The antenna 102 can receive a radio wave of a wireless signal. When the first control signal B3 is at a high level, the switch 106 connects an output terminal of the wave detector 105 to the input terminal of the arithmetic unit 108, and the switch 103 passes the input signal of the terminal A1 and outputs the signal from the terminal A2. The arithmetic unit 108 multiplies the received signal of the antenna 102 by +1.

Further, when the first control signal B3 is at a low level, the switch 106 connects the output terminal of the wave detector 105 to the input terminal of the arithmetic unit 109, and the switch 103 outputs the reference signal from the terminal A2. The arithmetic unit 109 multiplies the reference signal by −1. The reference signal corresponds to the noise level.

The integrator 111 integrates the output signals of the arithmetic units 108 and 109. Specifically, the integrator 111 outputs a signal which is the result of canceling a noise level from the received signal of the antenna 102.

Figure 4:
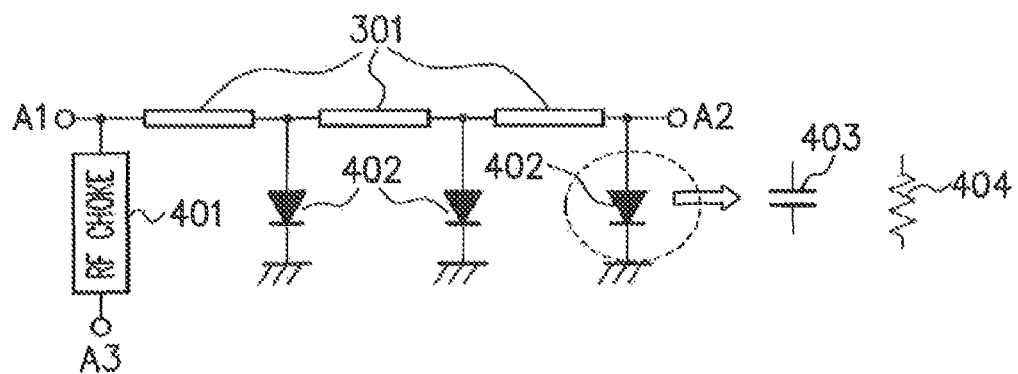
FIG. 4 is a circuit diagram showing another configuration example of the SPST switch.

FIG. 4 is a circuit diagram showing another configuration example of the SPST switch 103 of FIG. 1. A plurality of inductors 301 are connected in series between the terminals A1 and A2. The inductor 103 may be an inductor component of a transmission line. A plurality of diodes 402 are connected in parallel, and anodes are respectively connected to the interconnection points of a plurality of inductors 301, whereas cathodes are connected to reference potentials. An RF choke 401 is an inductor having a large inductance value, and is connected between the terminal of the bias A3 and the anode of the diode 402. The RF choke 401 has a high impedance with respect to a high frequency wave signal which is inputted into the terminal A1, and has a low impedance with respect to a direct-current bias A3.

When the bias A3 is a negative bias, the diode 402 functions as a capacitor 403 by a reverse bias. In this case, the inductor 301 and the capacitor 403 function as a matching circuit as in FIG. 3, and when impedance matching of, for example, 50Ω is achieved, the signal inputted in the terminal A1 passes through the switch 103 and is outputted from the terminal A2.

When the bias A3 is a positive bias on the other hand, the diode 402 functions as a resistance 404 by a forward bias. In this case, impedance matching is not achieved, and therefore, the signal inputted in the terminal A1 does not pass through the switch 103. The terminal A2 outputs a reference signal (noise) corresponding to the resistance 404.

As above, when the first control signal B3 becomes a high level (first state), the SPST switch 103 passes the signal received via the antenna 102 and outputs it, and when the first control signal B3 is at a low level (second state), the SPST switch 103 connects the signal received via the antenna 102 to the reference potential.

The SPST switch 103 has a plurality of inductors 301 connected in series between the terminals A1 and A2, and impedance elements which are connected between the interconnection points of a plurality of inductors 301 and the reference potentials, function as capacitors when the first control signal B3 is at a high level, and function as a resistance when the first control signal B3 is at a low level. The impedance element is the transistor 302 or the diode 402.

The SPDT switch 106, the arithmetic unit 108, the arithmetic unit 109, the adder 110 and the integrator 111 constitute a difference circuit (subtracting circuit). The difference circuit outputs a difference signal between the output signal of the SPST switch 103 when the first control signal B3 is at a high level, and the output signal of the SPST switch 103 when the first control signal B3 is at a low level.

The arithmetic unit 108 is a first arithmetic unit which multiplies the output signal of the wave detector 105 by a first sign (for example, +1). The arithmetic unit 109 is a second arithmetic unit which multiplies the output signal of the detector 105 by a second sign (for example, −1) which is opposite from the aforesaid first sign. The multiplication coefficients of the arithmetic units 108 and 109 are not limited to +1 and −1, and the arithmetic units 108 and 109 may multiply any coefficients having opposite signs from each other and having the same absolute value.

The SPDT switch 106 connects the output signal of the wave detector 105 to the arithmetic unit 108 when the first control signal B3 is at a high level, and connects the output signal of the detector 105 to the arithmetic unit 109 when the first control signal B3 is at a low level. The integrator 111 integrates the signals multiplied by the arithmetic units 108 and 109.

As a result that the switch driver 107 adjusts the duty ratio of the first control signal B3, the reference signal level (noise level) is made variable, and noise which always occurs in the low noise amplifier 104 can be cancelled.

Figure 7:
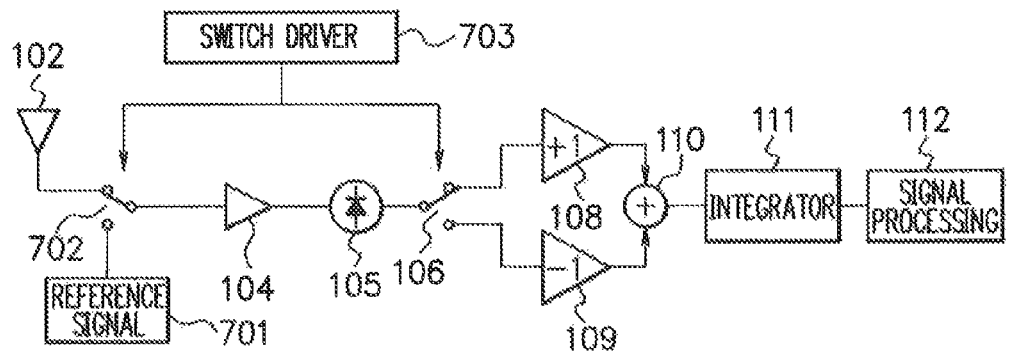
FIG. 7 is a diagram showing a configuration example of a Dicke type receiver.
Figure 8:
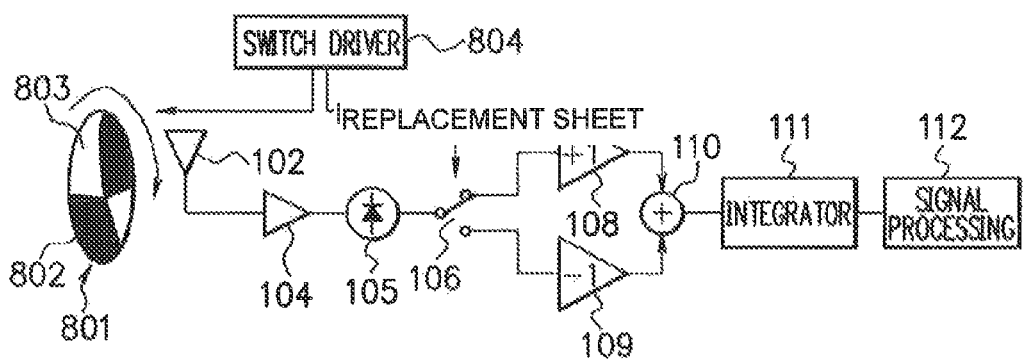
FIG. 8 is a diagram showing another configuration example of a Dicke type receiver.
Figure 9:
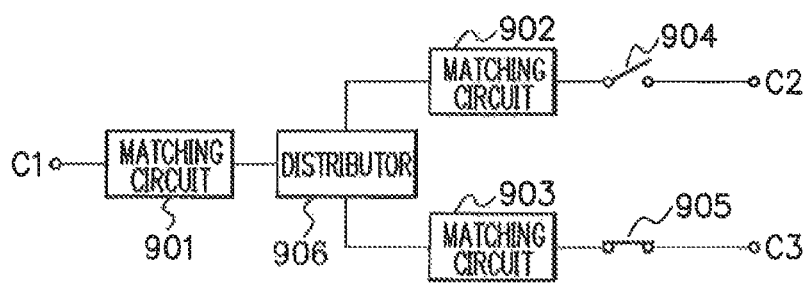
FIG. 9 is a diagram showing one example of an SPDT switch.

This embodiment does not require the chopper 801 in FIG. 8, and uses the SPST switch 103 instead of the SPDT switch 702 and the reference signal source 702 in FIG. 7. As shown in FIG. 9, the SPDT switch 702 uses the three matching circuits 901 to 903, and therefore, is increased in size. This embodiment uses the SPST switch 103 having the only one matching circuit, can make the semiconductor chip area of the receiver compact, and reduction in cost can be realized.

In the receivers in FIGS. 7 and 8, adjustment of the reference signal level is difficult. In the embodiment, the switch driver 107 controls the duty ratio of the first control signal B3, whereby the reference signal level can be easily adjusted with high accuracy.

By providing a single pole single through switch instead of a single pole double through switch, the receiver can be made compact. By controlling the single pole single through switch, the reference signal level can be easily adjusted.

The above described embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A receiver, comprising:
    an antenna for receiving a wireless signal;
    a single pole single through switch which passes a signal received via said antenna and outputs the signal when a first control signal is in a first state, and connects a signal received via said antenna to a reference potential when the first control signal is in a second state; and
    a difference circuit which outputs a difference signal of an output signal of said single pole single through switch when the first control signal is in the first state and an output signal of said single pole single through switch when the first control signal is in the second state,
    wherein when the first control signal is the first state, the single pole single through switch connects the antenna to the difference circuit, and when the first control signal is in the second state, the singe pole single through switch connects the antenna and the difference circuit to the reference potential, and outputs the reference potential.

2. The receiver according to claim 1,
    wherein said single pole single through switch comprises:
    a plurality of inductors connected in series between said antenna and said difference circuit; and
    an impedance element which is connected between an interconnection point of said plurality of inductors and a reference potential, functions as a capacitor when the first control signal is in the first state, and functions as a resistance when the first control signal is in the second state.

3. The receiver according to claim 2, wherein the impedance element is a transistor.

4. The receiver according to claim 2,
    wherein the impedance element is a field-effect transistor in which a drain and a source are connected to the interconnection point of the plurality of inductors and the reference potential, and a gate is connected to a bias corresponding to the first control signal.

5. The receiver according to claim 4,
    wherein the gate of the field-effect transistor is connected to a negative bias when the first control signal is in the first state, and is connected to a positive bias when the first control signal is in the second state.

6. The receiver according to claim 2, wherein the impedance element is a diode.

7. The receiver according to claim 2,
    wherein the impedance element is a diode in which an anode and a cathode are connected to an interconnection point of said plurality of inductors and a reference potential,
    said receiver further comprising an inductor connected between the anode of the diode and a bias terminal,
    wherein the bias terminal is connected to a bias corresponding to the first control signal.

8. The receiver according to claim 7,
    wherein the bias terminal is connected to a negative bias when the first control signal is in the first state, and is connected to a positive bias when the first control signal is in the second state.

9. The receiver according to claim 1, further comprising a radio wave absorber for shutting off radio wave input into said antenna.

10. The receiver according to claim 1,
    wherein said difference circuit comprises:
    a first arithmetic unit which multiplies the output signal of said single pole single through switch by a first sign,
    a second arithmetic unit which multiplies the output signal of said single pole single through switch by a second sign which is opposite from the first sign,
    a single pole double through switch which connects the output signal of said single pole single through switch to the first arithmetic unit when the first control signal is in the first state, and connects the output signal of said single pole single through switch to the second arithmetic unit when the first control signal is in the second state, and
    an integrator which integrates signals which are multiplied by the first arithmetic unit and the second arithmetic unit.

11. The receiver according to claim 1, further comprising a switch driver which outputs the first control signal,
    wherein the first control signal is a pulse signal including the first and the second states, and
    said switch driver can change a duty ratio of the first and the second states.

12. The receiver according to claim 1, further comprising an amplifier which is provided between said single pole single through switch and said difference circuit.

13. The receiver according to claim 12, further comprising a wave detector which is provided between said amplifier and said difference circuit.

14. The receiver according to claim 13,
    wherein said difference circuit comprises:
    a first arithmetic unit which multiplies the output signal of said single pole single through switch by a first sign,
    a second arithmetic unit which multiplies the output signal of said single pole single through switch by a second sign which is opposite from the first sign,
    a single pole double through switch which connects the output signal of said single pole single through switch to the first arithmetic unit when the first control signal is in the first state, and connects the output signal of said single pole single through switch to the second arithmetic unit when the first control signal is in the second state, and
    an integrator which integrates signals which are multiplied by the first arithmetic unit and the second arithmetic unit.

15. The receiver according to claim 14, further comprising a radio wave absorber for shutting off radio wave input into said antenna.

16. The receiver according to claim 15,
wherein said single pole single through switch comprises:
a plurality of inductors connected in series between said antenna and said difference circuit, and
an impedance element which is connected between an interconnection point of the plurality of inductors and a reference potential, functions as a capacitor when the first control signal is in the first state, and functions as a resistance when the first control signal is in the second state.

17. The receiver according to claim 16,
wherein the impedance element is a field-effect transistor in which a drain and a source are connected to the interconnection point of said plurality of inductors and the reference potential, and a gate is connected to a bias corresponding to the first control signal.

18. The receiver according to claim 17,
wherein the gate of the field-effect transistor is connected to a negative bias when the first control signal is in the first state, and is connected to a positive bias when the first control signal is in the second state.

19. The receiver according to claim 16,
wherein the impedance element is a diode in which an anode and a cathode are connected to the interconnection point of said plurality of inductors and the reference potential,
said receiver further comprising an inductor connected between the anode of the diode and a bias terminal, and
wherein the bias terminal is connected to a bias corresponding to the first control signal.

20. The receiver according to claim 19,
wherein the bias terminal is connected to a negative bias when the first control signal is in the first state, and is connected to a positive bias when the first control signal is in the second state.

* * * * *